United States Patent [19]

Ebnöther et al.

[11] 3,892,774
[45] July 1, 1975

[54] CYCLO PENTATHIOPHENE DERIVATIVES

[75] Inventors: Anton Ebnöther, Arlesheim; Fulvio Gadient, Birsfelden; Rudolf Süess, Bettingen, all of Switzerland

[73] Assignee: Sandoz Ltd., Basel, Switzerland

[22] Filed: Sept. 6, 1974

[21] Appl. No.: 503,968

[30] Foreign Application Priority Data
Sept. 11, 1973 Switzerland.................. 13024/73

[52] U.S. Cl......... 260/332.2 A; 260/329 F; 424/275
[51] Int. Cl............................................... C07d 63/00
[58] Field of Search... 260/332.2 H, 329 F, 332.2 A

[56] References Cited
UNITED STATES PATENTS
3,832,354    8/1974    Gadient................ 260/332.2 H OTHER PUBLICATIONS
Helmkamp, "Chem Abstracts," (1969), Vol. 71, p. 91889y.

*Primary Examiner*—Leon Zitver
*Assistant Examiner*—A. Siegel
*Attorney, Agent, or Firm*—Gerald D. Sharkin; Robert S. Honor

[57] ABSTRACT

This invention provides new compounds of formula I,

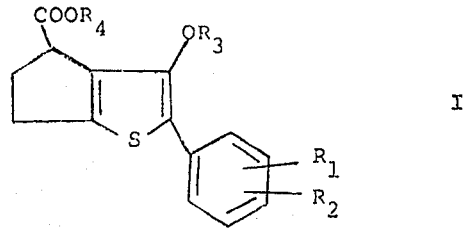

I wherein
  $R_1$ is hydrogen, chlorine, bromine, lower alkyl or lower alkoxy,
  $R_2$ is hydrogen, chlorine, bromine, lower alkyl, lower alkoxy or, when $R_1$ is hydrogen, also fluorine or trifluoromethyl,
  $R_3$ is hydrogen or lower alkyl, and
  $R_4$ is hydrogen or lower alkyl, Useful as anti-phlogistic and anti-arthritic agents.

23 Claims, No Drawings

CYCLO PENTATHIOPHENE DERIVATIVES

The present invention relates to heterocyclic compounds.

In accordance with the invention there are provided compounds of formula I,

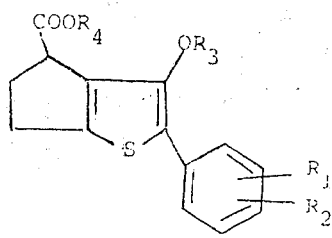

wherein
$R_1$ is hydrogen, chlorine, bromine, lower alkyl or lower alkoxy,
$R_2$ is hydrogen, chlorine, bromine, lower alkyl, lower alkoxy or, when $R_1$ is hydrogen, also fluorine or trifluoromethyl,
$R_3$ is hydrogen or lower alkyl, and
$R_4$ is hydrogen or lower alkyl or, when at least one of $R_3$ and $R_4$ is hydrogen, alternatively a salt thereof with a pharmaceutically acceptable cation.

Further, in accordance with the invention a compound of formula I may be obtained by a process comprising a. reducing the carbonyl group in the 6-position of the ring structure in a compound of formula II,

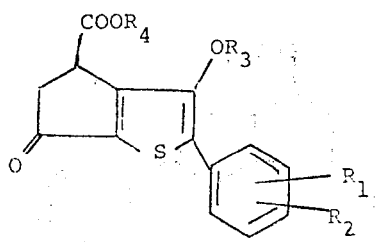

wherein
$R_1$, $R_2$, $R_3$ and $R_4$ are as defined above, or b. hydrolyzing a compound of formula Ib,

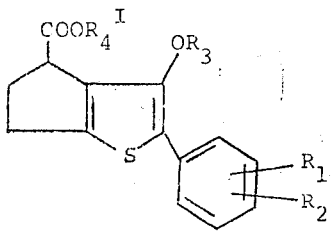

wherein
$R_1$, $R_2$ and $R_3$ are as defined above, and
$R_4'$ is lower alkyl,
to produce a compound of formula Ia,

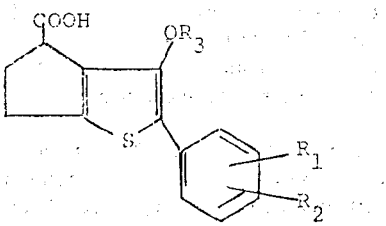

wherein
$R_1$, $R_2$ and $R_3$ are as defined above, or c. converting a hydroxy group into an alkyl group in a compound of formula I wherein at least one of $R_3$ and $R_4$ are hydrogen to produce a compound of formula I wherein at least one of $R_3$ and $R_4$ are independently alkyl.

The substituents $R_1$ and $R_2$ in the compounds of formula I preferably signify hydrogen, or $R_1$ is chlorine and $R_2$ is hydrogen. When $R_1$ or $R_2$ is lower alkyl or lower alkoxy, these preferably contain 1 to 4 carbon atoms and especially signify methyl or methoxy. $R_3$ preferably signifies a lower alkyl group preferably containing 1 to 4, especially 1 or 2 carbon atoms, and preferably signifies methyl. $R_4$ preferably signifies hydrogen. When $R_4$ is lower alkyl, this preferably contains 1 to 4 carbon atoms.

Any carbon-containing radical not particularly herein defined preferably has up to 5 carbon atoms.

The reduction of keto compounds of formula II in accordance with the invention may be effected in accordance with the usual methods for the selective reduction of a carbonyl group to the methylene group. Suitable reduction processes are, for example, the reduction in accordance with Clemmensen or the method of Wolff-Kishner. Thus, for example, a compound of formula II may be reduced in accordance with Clemmensen with amalgamated zinc/hydrochloric acid, or a compound of formula II wherein $R_3$ is lower alkyl may be treated with hydrazine hydrate in the presence of a strong base in accordance with Wolff-Kishner. The Clemmensen reduction may be effected either with the addition of a water immiscible, inert, organic solvent, e.g. an aromatic hydrocarbon such as, for example, benzene, toluene or xylene, in a two-phase system, optionally with the addition of a small amount of a solution aid, e.g. glacial acetic acid, or, if desired, with the addition of an inert, water miscible organic solvent, e.g. glacial acetic acid, in a one-phase system. The reaction is preferably effected at an elevated temperature, e.g. at a temperature between 50° and 130°C, preferably at the boiling temperature of the reaction mixture.

The reaction is preferably effected using a 2 to 4 N acid and a two-phase system. When higher acid concentrations are used, a partial or complete splitting of any present thiophene ether groups ($R_3$ = lower alkyl) and/or ester groups ($R_4$ = lower alkyl) may naturally occur simultaneously with the reduction. When, for example, a 6N acid is used the thiophene ether group may, for example, be completely split, so that when a keto acid of formula II, wherein $R_3$ is lower alkyl, is used as starting material, an acid of formula I, wherein $R_3$ is hydrogen, may be obtained. The Wolff-Kishner reduction of a compound of formula II may, for example, be effected by reaction with hydrazine hydrate in the presence of a strong base, e.g. sodium or potassium hydroxide, and an inert, high-boiling, water miscible, organic solvent, e.g. a polyalcohol, preferably diethylene or triethylene glycol, at a temperature between about 130° and 190°C.

It will be appreciated that hydrolysis of any ester group present may occur under alkaline conditions.

Process (b) of the invention may be effected in accordance with the usual methods for ester hydrolysis. For example, a compound of formula Ib may be allowed to react with water at a temperature between room temperature and about 100° C, preferably at the boiling temperature of the reaction mixture, optionally with the addition of an inert, water miscible, organic solvent, e.g. a lower alkanol such as methanol or ethanol, acetone, tetrahydrofuran or dioxane. There is conveniently present a base, e.g. an alkali metal or alkaline earth metal hydroxide, or an acid catalyst, e.g. a mineral acid such as hydrochloric or sulphuric acid, or an organic sulphonic acid. The hydrolysis is preferably effected in an alkaline medium, e.g. with at least an equivalent amount of an aqueous alkali metal hydroxide solution.

Process variant (c) may be effected in conventional manner for esterification and/or etherification reactions. For example the reaction may be carried out under analogous conditions as described in process variant (c') and/or (d') hereinafter, e.g. in a lower alcohol saturated with hydrogen chloride gas.

The compounds of formula I may be isolated from the reaction mixture and purified in known manner.

Free forms of compounds of formula I wherein at least one of $R_3$ and $R_4$ are hydrogen may be converted into salt forms in conventional manner and vice versa. A suitable salt form is the sodium salt form.

A compound of formula II may be produced, for example as follows:

a'. by cyclizing a compound of formula III,

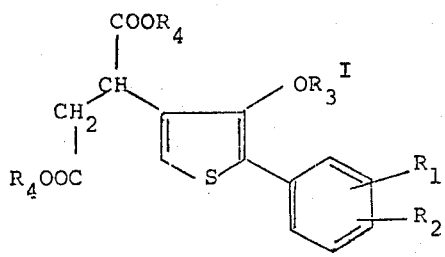

III wherein
$R_1$, $R_2$ and $R_4$ are as defined above, and
$R_3{}'$ is lower alkyl,
to produce a compound of formula IIa

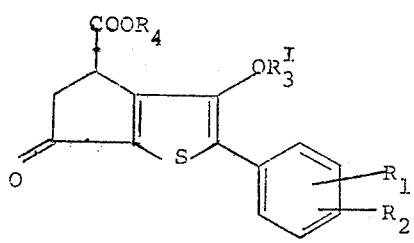

IIa wherein
$R_1$, $R_2$ $R_3{}'$ and $R_4$ are as defined above, or
b'. by converting a compound of formula IV,

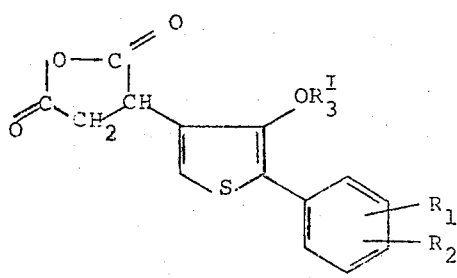

IV wherein
$R_1$, $R_2$ and $R_3{}'$ are as defined above,
into a compound of formula IIb

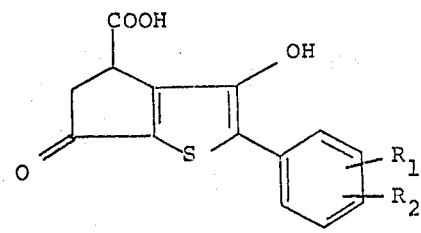

IIb wherein
$R_1$ and $R_2$ are as defined above
c'. by esterifying a compound of formula IIc

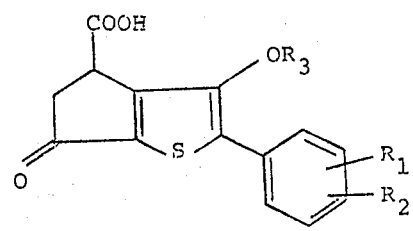

IIc wherein
$R_1$, $R_2$ and $R_3$ are as defined above,
to produce a compound of formula IId

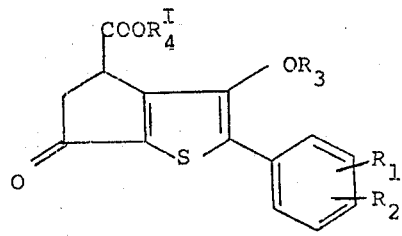

IId wherein
$R_1$, $R_2$, $R_3$ and $R_4{}'$ are as defined above
d'. by etherifying a compound of formula IIe

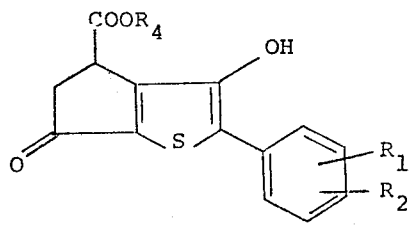

IIe wherein
$R_1$, $R_2$ and $R_4$ are as defined above,
to produce a compound of formula IIa, or
e'. by hydrolysing a compound of formula IId to produce a compound of formula IIc.

Process variant (a') may be effected with polyphosphoric acid. A suitable temperature is between 110° and 130° C.

Process variant (b') may be effected under Friedel-Crafts reaction conditions, e.g. with aluminium trichloride. An inert organic solvent, e.g. methylene chloride, is preferably present.

Process variant (c′) may be effected in a lower alcohol saturated with hydrogen chloride. Under vigorous reaction conditions or extended reaction times the 3-hydroxy group may be etherified.

Process variant (d′) may be effected by reaction with a lower alkyl halide, such as the iodide. A strong basic condensation agent, e.g. sodium hydride is preferably present. The reaction is preferably effected in dimethyl formamide.

Process variant (e′) may be effected under alkaline conditions, e.g. with potassium hydroxide. Aqueous methanol and/or ethanol is a suitable solvent medium.

It will be appreciated that interconversion processes (c′), (d′) and (e′) are useful ways of purifying compounds of formula IIa and IIb.

A compound of formula III may be obtained in conventional manner by a″. reacting a compound of formula V

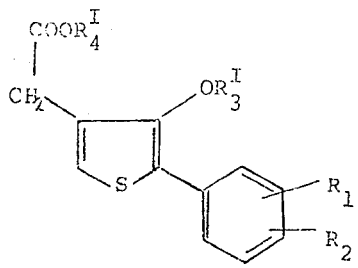

wherein
$R_1$, $R_2$, $R_3'$ and $R_4'$ are as defined above
with a compound of formula VI

X CH$_2$ . COOR$_4'$     VI wherein
$R_4'$ is as defined above and
X is chlorine, bromine or iodine
to produce a compound of formula IIIa

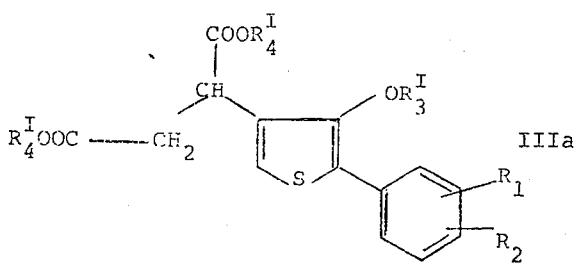

wherein
$R_1$, $R_2$, $R_3'$ and $R_4'$ are as defined above, or b″. hydrolysing a compound of formula IIIa to produce a compound of formula IIIb

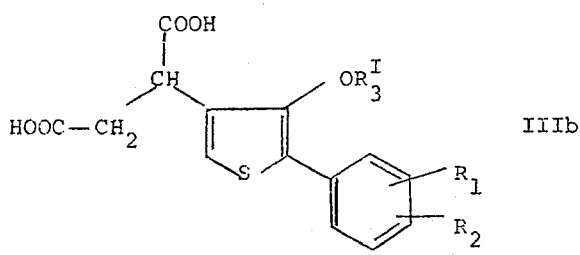

wherein
$R_1$, $R_2$ and $R_3'$ are as defined above.

Process variant (a″) may be effected in the presence of a strong basic condensation agent, e.g. sodium amide. An inert solvent, e.g. ammonia, is preferably present.

Process variant (b″) may be effected as described above for process variant (e′).

A compound of formula IV may be produced by selectively dehydrating a compound of formula IIIb. The dehydration may be effected with acetic anhydride or alternatively with polyphosphoric acid. Benzene or xylene is conveniently used as an inert solvent. The reaction is preferably effected at the reflux temperature.

Insofar as the production of the starting materials is not described, these are known or may be produced in accordance with known processes or in a manner analogous to the processes described herein or to known processes.

In the following non-limitative Examples all temperatures are indicated in degrees Centigrade.

EXAMPLE 1

5,6-dihydro-3-methoxy-2-phenyl-4H-cyclopenta[b]thiophene-4-carboxylic acid [process variant (a)]

50 g of 5,6-dihydro-3-methoxy-6-oxo-2-phenyl-4H-cyclopenta[b]thiophene-4-carboxylic acid are boiled at reflux for 1 hour, while stirring, in a mixture of 250 cc of 3 N hydrochloric acid, 25 cc of glacial acetic acid and 500 cc of toluene, together with 200 g of flowers of zinc previously corroded with 20 g of mercury(II) chloride in 150 cc of 0.3 N hydrochloric acid. A further 100 g of corroded zinc are then added and boiling is continued for 2 hours. The metal is filtered off whilst hot, the hydrochloric acid layer is separated from the toluene phase and this is extracted with a mixture of 200 cc of a 2 N caustic soda solution and 40 cc of ethanol. The lye extract is acidified with 5 N sulphuric acid while cooling with ice, and extraction is effected with methylene chloride. After drying over magnesium sulphate, the solvent is evaporated and the brown-coloured, crystalline evaporation residue is chromatographed on a 30-fold quantity of silica gel. The title compound is eluted with toluene/ethyl acetate 9:1. After recrystallization from acetic acid, the title compound has a M.P. of 167°–169° (decomp.).

The starting material may be produced as follows:

a. 2-(4-methoxy-5-phenyl-3-thienyl)succinic acid dimethyl ester 143 g of 4-methoxy-5-phenyl-3-thienyl-acetic acid methyl ester, dissolved in a small amount of ether, are added dropwise at −40° to −50° within 30 minutes, to a suspension of sodium amide in liquid ammonia, produced from 12.5 g of sodium, 600 cc of liquid ammonia and a small amount of iron(III) nitrate. The reaction mixture is stirred at the same temperature for 3 hours. 100 g of bromoacetic acid methyl ester, dissolved in ether, are subsequently added dropwise within 30 minutes and stirring is continued at −40° for at least 6 hours. Working up is effected by adding 35 g of ammonium chloride and allowing the ammonia to evaporate, whereby 1 litre of ether is simultaneously added dropwise, and extraction is effected with water. The aqueous phase is separated and the ether phase is washed with water. After drying over magnesium sulphate, evaporation to dryness is effected. 2-(4-methoxy-5-phenyl-3-thienyl)succinic acid dimethyl ester is obtained as oily residue, which is purified by distillation in a Hickmann flask. B.P. 190° at 0.1 mm of Hg.

b. 2-(4-methoxy-5-phenyl-3-thienyl)succinic acid 36.2 g of the crude ester obtained in section (a) above are boiled at reflux for 4 hours in a mixture of 16.8 g of potassium hydroxide, 50 cc of water, 80 cc of methanol and 30 cc of ethanol. The alcohol is then largely removed by evaporation and the concentrate is washed with 75 cc of ether. The remaining aqueous phase is acidified with 5 N sulphuric acid with the addition of ice, and is extracted with ether. The ether extract is washed with water, dried over magnesium sulphate and concentrated, and the resulting crude acid is recrystallized from ether/petroleum ether and dried in a high vacuum at 60°. M.P. 173°–176° (decomp.).

c. 5,6-dihydro-3-methoxy-6-oxo-2-phenyl-4H-cyclopenta[b]thiophene-4-carboxylic acid 10 g of the acid obtained in section (b) above are added to 100 g of polyphosphoric acid heated to 125° (produced from 30 cc of 85% o-phosphoric acid and 55 g of phosphorus pentoxide) and the reaction mixture, which turns dark green or black-coloured, is stirred for 1 hour at 125°. The reaction mixture is subsequently poured on ice and extracted with ethyl acetate. The organic phase is washed with water, dried over magnesium sulphate and concentrated and the resulting 5,6-dihydro-3-methoxy-6-oxo-2-phenyl-4H-cyclopenta[b]thiophene-4-carboxylic acid is purified via the methyl ester thereof. This is effected in that a hot solution of the crude cyclization produce in 25 cc of methanol is added to 50 cc of methanol saturated with hydrogen chloride gas, hydrogen chloride gas is again added until saturation and stirring is effected at room temperature for 12 hours. The reaction mixture is subsequently concentrated and the residue is divided between methylene chloride and ice water. The methylene chloride phase is washed with potassium hydrogen carbonate solution and water, is dried over magnesium sulphate and concentrated, and the resulting crude methyl ester is purified by chromatography. (M.P. 104° to 106°, from methanol). 6.4 g of the methyl ester are dissolved in 70 cc of methanol while heating and after the addition of a solution of 2.1 g of potassium hydroxide in 9 cc of water, boiling at reflux is effected for 4 hours. The methanol is then evaporated and the resulting, aqueous solution is washed with ether. The aqueous layer is subsequently acidified with 5 N sulphuric acid and extracted with ether. The ether extract is washed with a saturated sodium chloride solution, dried over magnesium sulphate and concentrated, and the resulting, 5,6-dihydro-3-methoxy-6-oxo-2-phenyl-4H-cyclopenta[b]thiophene-4-carboxylic acid is crystallized from acetone/pentane. M.P. 164°–166°.

The following 5,6-dihydro-2-phenyl-4H-cyclopenta[b]thiophene-4-carboxylic acid derivatives may also be obtained in a manner analogous to that described in Example 1, by reduction of the corresponding 5,6-dihydro-6-oxo-2-phenyl-4-cyclopenta[b]thiophene-4-carboxylic acid derivatives:

2-(3-chlorophenyl)-5,6-dihydro-3-methoxy-4H-cyclopenta[b]thiophene-4-carboxylic acid, M.P. 169°–171° from ether/pentane),
5,6-dihydro-3-methoxy-2-p-tolyl-4H-cyclopenta[b]thiophene-4-carboxylic acid,
2-(4-fluorophenyl)-5,6-dihydro-3-methoxy-4H-cyclopenta[b]thiophene-4-carboxylic acid,
2-(4-trifluoromethylphenyl)-5,6-dihydro-3-methoxy-4H-cyclopenta[b]thiophene-4-carboxylic acid.

EXAMPLE 2

5,6-dihydro-3-methoxy-2-phenyl-4H-cyclopenta[b]thiophene-4-carboxylic acid

A. 28.3 g of 5,6-dihydro-3-methoxy-6-oxo-2-phenyl-4H-cyclopenta[b]thiophene-4-carboxylic acid methyl ester are heated at 175° for 75 minutes, in an atmosphere of nitrogen, with the addition of 19 cc of hydrazine hydrate and 21.6 g of potassium hydroxide in 200 cc of diethylene glycol. After nitrogen evolution stops, dilution is effected with a three-fold quantity of water, filtration is effected and the filtrate is acidified with dilute sulphuric acid and extracted with ether. The ether extract is concentrated by evaporation and the resulting crude title compound is purified via the methyl ester. This is effected by dissolving the resulting crude product in methanol and saturating with hydrogen chloride gas while cooling. After allowing to stand at room temperature for 18 hours, evaporation to dryness is effected and the residue is divided between ether and water. The ether extract is washed with a sodium bicarbonate solution and water, dried and concentrated by evaporation. The resulting methyl ester is chromatographed on silica gel with chloroform/ethanol (49:1). The concentrated eluate is saponified by boiling at reflux for 4 hours with 2 N potassium hydroxide/methanol (1:1). After the usual working up, the title compound is obtained in the form of yellow-coloured crystals. After recrystallization from benzene/petroleum ether, the title compound has a M.P. of 167°–169° (decomp.).

B. The title compound is obtained in a manner analogous to that described in Example 2(A), using 5,6-dihydro-3-methoxy-6-oxo-2-phenyl-4H-cyclopenta[b]thiophene-4-carboxylic acid as starting material. M.P. 167°–169° (decomp.).

The starting material for Example 2A may be produced as follows:

a. 10 g of 2-(4-methoxy-5-phenyl-3-thienyl)succinic acid dimethyl ester are stirred at 110° in 100 g of polyphosphoric acid for 4 hours. The reaction mixture is divided between water and chloroform, the chloroform phase is successively washed with water, a saturated sodium bicarbonate solution and again with water, is dried over magnesium sulphate, and the solvent is evaporated to dryness. The resulting crude 5,6-dihydro-3-methoxy-6-oxo-2-phenyl-4H-cyclopenta[b]thiophene-4-carboxylic acid methyl ester is crystallized from methanol, P.F. 104°–106°.

EXAMPLE 3

2-(4-chlorophenyl)-5,6-dihydro-3-methoxy-4H-cyclopenta[b]thiophene-4-carboxylic acid The title compound is produced in a manner analogous to that described in Example 1, by reduction in accordance with Clemmensen, from 2-(4-chlorophenyl)-5,6-dihydro-3-methoxy-6-oxo-4H-cyclopenta[b]thiophene-4-carboxylic acid. M.P. 170°–173° (ether/petroleum ether).

Starting material a. 2-[5-(4-chlorophenyl)-4-methoxy-3-thienyl]succinic acid diethyl ester Produced in a manner analogous to Example 1(a), viscous oil; used for the next reaction in crude state.

2-[5-(4-chlorophenyl)-4-methoxy-3-thienyl]succinic acid

Produced in a manner analogous to Example 1(b). M.P. 200°–202° (ether).

c. 2-(4-chlorophenyl)-5,6-dihydro-3-methoxy-6-oxo-4H-cyclopenta[b]thiophene-4-carboxylic acid Produced in a manner analogous to Example 1(c). M.P. 173°–175° (methylene chloride/ether/pentane).

EXAMPLE 4

5,6-dihydro-3-methoxy-2-(4-methoxyphenyl)-4H-cyclopenta[b]thiophene-4-carboxylic acid The title compound is produced in a manner analogous to that described in Example 1, by reduction in accordance with Clemmensen, from 5,6-dihydro-3-methoxy-2-(4-methoxyphenyl)-6-oxo-4H-cyclopenta[b]thiophene-4-carboxylic acid: yellow-coloured crystals having a M.P. of 140° (benzene).

Starting material a. 2-[4-methoxy-5-(4-methoxyphenyl)-3-thienyl]-succinic acid diethyl ester Produced in a manner analogous to Example 1(a); viscous oil; used for the next reaction in crude state.

b. 2-[4-methoxy-5-(4-methoxyphenyl)-3-thienyl]-succinic acid

Produced in a manner analogous to Example 1(b). M.P. 185°–186° (decomp.) (acetone).

c. 5,6-dihydro-3-methoxy-2-(4-methoxyphenyl)-6-oxo-4H-cyclopenta[b]thiophene-4-carboxylic acid Produced in a manner analogous to Example 1(c). M.P. 193°–194° (decomp.) (methanol); yellow-coloured. [M.P. of the methyl ester 123°–125° (from ethyl acetate), yellow crystals].

EXAMPLE 5

5,6-dihydro-3-hydroxy-2-phenyl-4H-cyclopenta[b]thiophene-4-carboxylic acid 10 g of 5,6-dihydro-3-hydroxy-6-oxo-2-phenyl-4-cyclopenta[b]thiophene-4-carboxylic acid are boiled at reflux, while stirring, in a mixture of 7.5 cc of glacial acetic acid, 30 cc of 3 N hydrochloric acid and 250 cc of toluene, together with 10 g of flowers of zinc previously treated with 1 g of mercury (II) chloride in 1 cc of concentrated hydrochloric acid and 25 cc of water. After one hour, a further 10 g of corroded zinc are added to the mixture. Boiling is continued for 2 hours and the aqueous layer is separated. The organic phase is washed with water and subsequently extracted with an aqueous potassium carbonate solution. The aqueous layer is then acidified with dilute sulphuric acid and extracted with methylene chloride. After drying the methylene chloride extract over magnesium sulphate and evaporating the solvent, the crude title compound is obtained as crystallizing, brown oil which is purified by recrystallization from glacial acetic acid, M.P. 176°–179° (decomp.).

The starting material may be obtained as follows:
a. 2-(4-methoxy-5-phenyl-3-thienyl)succinic acid anhydride 38 g of 2-(4-methoxy-5-phenyl-3-thienyl)succinic acid are boiled at reflux for 4 hours in 130 cc of acetic anhydride and 400 cc of benzene. The dark-coloured reaction solution is evaporated to dryness and the resulting anhydride is crystallized from benzene/pentane. M.P. 91°–93°, B.P. 219°–230° at 0.2 mm of Hg.

b. A solution of 22.8 g of 2-(4-methoxy-5-phenyl-3-thienyl)succinic acid anhydride in 150 cc of methylene chloride is added dropwise at room temperature to a mixture of 350 cc of methylene chloride and 22.2 g of aluminium chloride, and the mixture is stirred at room temperature for a further 18 hours, whereby an oil separates from the dark reaction solution. The supernatant solution is subsequently poured off, the residue is decomposed with 5 N hydrochloric acid and after 1 hour the resulting precipitate is filtered off. The residue is washed with water, dried and added to hydrochloric acid in methanol, the reaction mixture is allowed to stand at room temperature for 18 hours, is then boiled at reflux for 3 hours and subsequently concentrated to half its volume. Upon cooling, 5,6-dihydro-3-hydroxy-6-oxo-2-phenyl-4H-cyclopenta[b]thiophene-carboxylic acid methyl ester crystallizes. M.P. 168°–171° (from methylene chloride/petroleum ether).

c. 5,6-dihydro-3-hydroxy-6-oxo-2-phenyl-4H-cyclopenta[b]thiophene-4-carboxylic acid 10 g of the methyl ester obtained in section b) above are boiled at reflux for 3 hours in a mixture of 40 cc of methanol, 20 cc of ethanol and a solution of 2.5 g of potassium hydroxide in 20 cc of water. The reaction solution is subsequently concentrated, acidified with 2 N sulphuric acid and extracted with ether. The ether extract is dried over magnesium sulphate and concentrated and the resulting crude acid is used for the next reaction without purification.

EXAMPLE 6

3-ethoxy-5,6-dihydro-2-phenyl-4H-cyclopenta[b]thiophene-4-carboxylic acid 3-ethoxy-5,6-dihydro-6-oxo-2-phenyl-4H-cyclopenta[b]thiophene-4-carboxylic acid is reduced to the title compound in a manner analogous to that described in Example 1. M.P. of the title compound 137°–139° (from ether/petroleum ether).

The starting material may be obtained as follows:
a. 3-ethoxy-5,6-dihydro-6-oxo-2-phenyl-4H-cyclopenta[b]thiophene-4-carboxylic acid A solution of 10 g of 5,6-dihydro-3-hydroxy-6-oxo-2-phenyl-4H-cyclopenta[b]thiophene-4-carboxylic acid in 100 cc of ethanol is saturated with hydrogen chloride gas. After boiling at reflux for 18 hours, the reaction mixture is evaporated to dryness and the residue is divided between ice water and ether. 3-Ethoxy-5,6-dihydro-6-oxo-2-phenyl-4H-cyclopenty[b]thiophene-4-carboxylic acid ethyl ester obtained after concentrating the ether layer is directly saponified to the acid in a manner analogous to that described in Example 5(c), and this acid is used for the next reaction without purification.

EXAMPLE 7

2-(2,5-dichlorophenyl)-5,6-dihydro-3-methoxy-4H-cyclopenta[b]thiophene-4-carboxylic acid 2-(2,5-dichlorophenyl)-5,6-dihydro-3-methoxy-6-oxo-4H-cyclopenta[b]thiophene-4-carboxylic acid is reduced by a Clemmensen reduction in a manner analogous to that described in Example 1. Working up is effected by washing the toluene phase containing the title compound with water, drying over magnesium sulphate, evaporating to dryness and chromatographying the residue on a 30-fold quantity of silica gel. The title compound is separated by elution with toluene/ethyl acetate 9:1 and is again purified chromatographically.

DC: Rf value: 0.75 (adsorbent: silica gel; eluant: chloroform/ethanol/formic acid 75:15:10).

The starting material may be obtained as follows:

a. 2-[5-(2,5-dichlorophenyl)-4-methoxy-3-thienyl]-succinic acid diethyl ester

Produced in a manner analogous to that described in Example 1 a); chromatographic purification on a 30-fold quantity of silica gel using chloroform containing increasing amounts (up to 5 %) of ethanol as eluant; used for the next reaction in crude state.

b. 2-[5-(2,5-dichlorophenyl)-4-methoxy-3-thienyl]-succinic acid

Produced in a manner analogous to that described in Example 1(b); white crystals having a M.P. of 188°–189° (from acetone/benzene).

c. 2-[5-(2,5-dichlorophenyl)-4-methoxy-3-thienyl]-succinic acid anhydride 10 g of the acid obtained in section (b) above are boiled at reflux for 4 hours, while stirring, in 100 g of polyphosphoric acid and 100 cc of xylene. The xylene phase is separated, evaporated to dryness, and the crude anhydride obtained as crystalline residue is dissolved and allowed to crystallize from benzene/pentane. M.P. 149°.

d. 2-(2,5-dichlorophenyl)-5,6-dihydro-3-methoxy-4H-cyclopenta[b]thiophene-4-carboxylic acid A solution of 6 g of the anhydride obtained in section (c) above in 75 cc of methylene chloride is added dropwise, at room temperature, to a mixture of 5 g of aluminum chloride in 25 cc of methylene chloride, while stirring. After standing at room temperature for 6 hours, the reaction mixture is poured on a mixture of ice and concentrated hydrochloric acid, the organic phase is separated, washed, dried over magnesium sulphate and concentrated. The dark, oily residue mainly containing 2-(2,5-dichlorophenyl)-5,6-dihydro-3-hydroxy-6-oxo-4H-cyclopenta[b]thiophene-4-carboxylic acid, is dissolved in 30 cc of methanol, and after saturation with hydrogen chloride gas, the solution is allowed to stand at room temperature for 18 hours. The methanol is subsequently evaporated, the reaction mixture is divided between methylene chloride and water, the organic phase is washed with a sodium hydrogen carbonate solution and subsequently with a sodium chloride solution, is dried over magnesium sulphate and the solvent is evaporated. The resulting brown oil, mainly containing 2-(2,5-dichlorophenyl)-5,6-dihydro-3-hydroxy-6-oxo-4H-cyclopenta[b]thiophene-4-carboxylic acid methyl ester, is dissolved in 30 cc of dimethyl formamide, 0.42 g of sodium hydride are added and heating to 60° is effected for 1 hour. Cooling to room temperature is then effected, 3.2 g of methyl iodide dissolved in 5 cc of dimethyl formamide are slowly added dropwise, the mixture is stirred at room temperature for 4 hours, is diluted with cold, 2 N hydrochloric acid and extracted with ether. The ether extract is washed with a sodium hydrogen carbonate solution, dried over magnesium sulphate and concentrated, whereby a brown oil, mainly containing 2-(2,5-dichlorophenyl)-5,6-dihydro-3-methoxy-6-oxo-4H-cyclopenta[b]thiophene-4-carboxylic acid methyl ester, is obtained. 6.3 g of this oil are boiled at reflux for 6 hours in a mixture of 50 cc of methanol, 25 cc of ethanol and a solution of 1.4 g of potassium hydroxide in 20 cc of water. The mixture is subsequently concentrated, diluted with water, extracted with ether, and the aqueous phase is acidified with 2 N sulphuric acid and subsequently extracted with ether. The ether extract is dried over magnesium sulphate and concentrated and the resulting crude acid is used for the next reaction without purification.

EXAMPLE 8

5,6-dihydro-3-hydroxy-2-phenyl-4H-cyclopenta[b]thiophene-4-carboxylic acid 10 g of 5,6-dihydro-3-methoxy-6-oxo-2-phenyl-4H-cyclopenta[b]thiophene-4-carboxylic acid methyl ester are boiled at reflux for 3 hours in a mixture of 100 cc of 6 N hydrochloric acid and 100 cc of glacial acetic acid with the addition of 30 g of flowers of zinc previously corroded with 3 g of mercury(II) chloride in 50 cc of water and 1.5 cc of concentrated hydrochloric acid for 5 minutes. A further 20 g of previously corroded zinc are added and the mixture is boiled at reflux for a further 2 hours, is poured off from the zinc, evaporated to dryness, the residue is taken up in methylene chloride/alcohol 95:5, extraction is effected with a 2 N caustic soda solution and the aqueous phase is acidified by the addition of an excess of 2 N sulphuric acid and extracted with methylene chloride. After drying over magnesium sulphate and evaporating the solvent, the resulting crude title compound is recrystallized from glacial acetic acid. M.P. of the title compound 176°–179° (decomp.).

EXAMPLE 9

5,6-dihydro-3-methoxy-2-phenyl-4H-cyclopenta[b]carboxylic acid methyl ester 1 g of 5,6-dihydro-3-methoxy-6-oxo-2-phenyl-4H-cyclopenta[b]thiophene-4-carboxylic acid methyl ester is boiled at reflux, while stirring, in a mixture of 0.5 cc of glacial acetic acid, 5 cc of 3 N hydrochloric acid and 30 cc of toluene, together with 1.5 g of flowers of zinc previously treated with 0.15 g of mercury(II) chloride in 0.1 cc of concentrated hydrochloric acid and 2.5 cc of water. After one hour, a further 1.5 g of zinc prepared as indicated above, are added to the mixture. Boiling is continued for 2 hours, filtration is effected, extraction is effected with water, a saturated sodium hydrogen carbonate solution and again with water, and the organic phase is dried over magnesium sulphate. After removing the solvent by evaporation, the title compound is obtained as viscous, yellow oil. B.P. 195°–200° at 0.1 mm of Hg (bulb tube); $n_D^{21} = 1.6095$. The acid obtained by hydrolysis of the title compound has a M.P. of 167°–169°.

The following 5,6-dihydro-2-phenyl-4H-cyclopenta[b]carboxylic acid alkyl ester derivatives may also be obtained in a manner analogous to that described in Example 9, by reduction of the corresponding 5,6-dihydro-6-oxo-2-phenyl-4-cyclopenta[b]thiophene-4-carboxylic acid alkyl ester derivatives:

2-(4-chlorophenyl)-5,6-dihydro-3-methoxy-4H-cyclopenta[b]thiophene-carboxylic acid methyl ester; M.P. of the acid obtained by hydrolysis: 170°–173°, 5,6-dihydro-3-methoxy-2-(4-methoxyphenyl)-4H-cyclopenta[b]thiophene-carboxylic acid methyl ester; M.P. of the acid obtained by hydrolysis: 140°, 5,6-dihydro-3-hydroxy-2-phenyl-4H-cyclopenta[b]thiophene-4-carboxylic acid methyl ester; M.P. of the acid obtained by hydrolysis: 176°–179°

5,6-dihydro-3-methoxy-2-p-tolyl-4H-cyclopenta[b]thiophene-4-carboxylic acid methyl ester, 3-ethoxy-5,6-dihydro-2-phenyl-4H-cyclopenta[b]thiophene-4-carboxylic acid ethyl ester; M.P. of the acid obtained by hydrolysis: 137°–139°, 2-(2,5-dichlorophenyl)-5,6-dihydro-3-methoxy-4H-cyclopenta[b]thiophene-4-carboxylic acid methyl ester.

EXAMPLE 10

5,6-dihydro-3-methoxy-2-phenyl-4H-cyclopenta[b]thiophene-4-carboxylic acid [process variant (b)]

5.7 g of 5,6-dihydro-3-methoxy-2-phenyl-4H-cyclopenta[b]carboxylic acid methyl ester are boiled at reflux for 3 hours in a solution of 1.7 g of potassium hydroxide in 5 cc of water and 30 cc of methanol. The methanol is removed at reduced pressure, the reaction mixture is diluted with water and washed once with ether. 30 cc of 2 N sulphuric acid are added to the aqueous solution and extraction is effected with methylene chloride. The methylene chloride phase is dried over magnesium sulphate and concentrated, whereby the title compound is obtained as crystallizing compound, having a M.P. of 167°–169° (decomp.) (from glacial acetic acid).

The 5,6-dihydro-2-phenyl-4H-cyclopenta[b]thiophene-4-carboxylic acid derivatives described in Examples 1–7 may also be obtained in a manner analogous to that described in Example 10, by hydrolysis of the corresponding lower alkyl esters.

The compounds of formula I are useful as anti-phlogistic agents e.g. for the inhibition of exudation in oedemas as indicated by an inhibition of oedema formation in rats in the carrageen paw oedema test in vivo on p.o. administration of from about 1 to about 20 mg/kg animal body weight of the compounds, and in the subchronic granuloma cyst test on p.o. administration of from about 20 to about 80 mg/kg animal body weight of the compounds.

For this use the dosage will, of course, vary depending on the compound employed, mode of administration and treatment desired. However, in general, satisfactory results are obtained when administered at a daily dosage of from about 0.1 mg to about 100 mg per kg animal body weight, conveniently given in divided doses 2 to 4 times a day or in sustained release form. For the larger mammals, the total daily dosage is in the range from about 10 to about 200 mg, and dosage forms suitable for oral administration comprise from about 2.5 mg to about 100 mg of the compounds admixed with a solid or liquid pharmaceutical carrier or diluent.

The compounds of formula I are furthermore useful as anti-arthritis agents, as indicated by an inhibition of swellings in the Freund adjuvant arthritis latent period test in rats on p.o. administration of from about 10 to about 50 mg/kg animal body weight of the compounds.

For this use the dosage will, of course, vary depending on the compound employed, mode of administration and treatment desired. However, in general, satisfactory results are obtained when administered at a daily dosage of from about 0.5 mg to about 50 mg per kg animal body weight, conveniently given in divided doses 2 to 4 times a day or in sustained release form. For the larger mammals, the total daily dosage is in the range from about 50 to about 300 mg, and dosage forms suitable for oral administration comprise from about 12 mg to about 150 mg of the compounds admixed with a solid or liquid pharmaceutical carrier or diluent.

The compounds of formula I wherein at least one of $R_3$ and $R_4$ are hydrogen may be administered in pharmaceutically acceptable salt form. Such salt forms exhibit the same order of activity as the free forms. Representative salt forms include alkali metal salts such as the sodium or potassium salt, alkaline earth metal salts such as the calcium salt and also include organic salts such as the ammonium salt and amine salts such as the dimethylamine, diethylamine, trimethylamine and benzylamine salts. Such compositions conveniently contain more than 1% by weight of the compound of formula I and may be prepared by conventional techniques to be in conventional forms, for example, capsules, tablets, suppositories, dispersible powders, syrups, elixirs, suspensions or solutions, for enteral or parenteral administration. Suitable pharmaceutical diluents or carriers include, for example, water, alcohols, natural or hardened oils and waxes, calcium and sodium carbonates, calcium phosphate, kaolin, talc and lactose as well as suitable preserving agents, such as ethyl-p-hydroxybenzoate, suspending agents such as methyl cellulose, tragacanth and sodium alginate, wetting agents such as lecithin, polyoxyethylene stearate and polyoxyethylene sorbitan mono-oleate, granulating and disintegrating agents such as starch and alginic acid, binding agents such as starch, gelatin and acacia, and lubricating agents such as magnesium stearate, stearic acid and talc, in order to provide an elegant and palatable pharmaceutical preparation. Compositions in tablet form may be coated by conventional techniques to delay disintegration of the tablet and absorption of the active ingredient in the gastro-intestinal tract and thereby provide sustained action over a long period.

In one group of compounds $R_1$ is hydrogen, chlorine, lower alkyl or alkoxy. In a sub-group $R_3$ is lower alkyl. In a further sub-group $R_1$ is hydrogen or chlorine.

The Example 1 compound is particularly interesting.

We claim:

1. A compound of formula I,

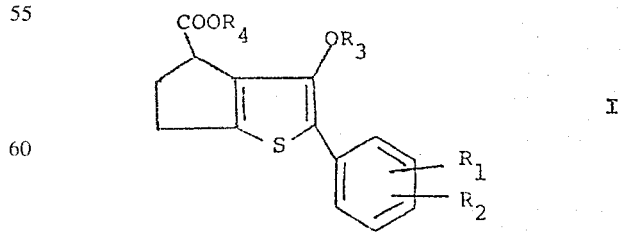

wherein $R_1$ is hydrogen, chlorine, bromine, lower alkyl or lower alkoxy, $R_2$ is hydrogen, chlorine, bromine, lower alkyl, lower alkoxy or, when $R_1$ is hydrogen, also fluorine or trifluoromethyl, $R_3$ is hydrogen or lower alkyl, and $R_4$ is hydrogen or lower alkyl, or, when at least one of $R_3$ and $R_4$ is hydrogen, alternatively a salt thereof with a pharmaceutically acceptable cation.

2. The compound of claim 1 which is 5,6-dihydro-3-methoxy-2-phenyl-4H-cyclopenta[b]thiophene-4-carboxylic acid.

3. The compound of claim 1 which is 2-(3-chlorophenyl)-5,6-dihydro-3-methoxy-4H-cyclopent[b]thiophene-4-carboxylic acid.

4. The compound of claim 1 which is 5,6-dihydro-3-methoxy-2-p-tolyl-4H-cyclopenta[b]-thiophene-4-carboxylic acid.

5. The compound of claim 1 which is 2-(4-fluorophenyl)-5,6-dihydro-3-methoxy-4H-cyclopenta[b]thiophene-4-carboxylic acid.

6. The compound of claim 1 which is 2-(4-trifluoromethylphenyl)-5,6-dihydro-3-methoxy-4H-cyclopenta[b]thiophene-4-carboxylic acid.

7. The compound of claim 1 which is 2-(4-chlorophenyl)-5,6-dihydro-3-methoxy-4H-cyclopenta[b]thiophene-4-carboxylic acid.

8. The compound of claim 1 which is 5,6-dihydro-3-methoxy-2-(4-methoxyphenyl)-4H-cyclopenta[b]thiophene-4-carboxylic acid.

9. The compound of claim 1 which is 5,6-dihydro-3-hydroxy-2-phenyl-4H-cyclopenta[b]thiophene-4-carboxylic acid.

10. The compound of claim 1 which is 3-ethoxy-5,6-dihydro-2-phenyl-4H-cyclopenta[b]thiophene-4-carboxylic acid.

11. The compound of claim 1 which is 2-(2,5-dichlorophenyl)-5,6-dihydro-3-methoxy-4H-cyclopenta[b]thiophene-4-carboxylic acid.

12. The compound of claim 1 which is 5,6-dihydro-3-methoxy-2-phenyl-4H-cyclopenta[b]thiophene-carboxylic acid methyl ester.

13. The compound of claim 1 which is 2-(4-chlorophenyl)-5,6-dihydro-3-methoxy-4H-cyclopenta[b]thiophene-carboxylic acid methyl ester.

14. The compound of claim 1 which is 5,6-dihydro-3-methoxy-2-(4-methoxyphenyl)-4H-cyclopenta[b]thiophene-carboxylic acid methyl ester.

15. The compound of claim 1 which is 5,6-dihydro-3-hydroxy-2-phenyl-4H-cyclopenta[b]thiophene-4-carboxylic acid methyl ester.

16. The compound of claim 1 which is 5,6-dihydro-3-methoxy-2-p-tolyl-4H-cyclopenta[b]thiophene-4-carboxylic acid methyl ester.

17. The compound of claim 1 which is 3-ethoxy-5,6-dihydro-2-phenyl-4H-cyclopenta[b]thiophene-4-carboxylic acid ethyl ester.

18. The compound of claim 1 which is 2-(2,5-dichlorophenyl)-5,6-dihydro-3-methoxy-4H-cyclopenta[b]thiophene-4-carboxylic acid methyl ester.

19. A compound of claim 1 wherein $R_4$ is lower alkyl.

20. A compound of claim 1 wherein $R_4$ is hydrogen.

21. A compound of claim 1 wherein $R_1$ is hydrogen, chlorine, lower alkyl or alkoxy.

22. A compound of claim 21 wherein $R_3$ is lower alkyl.

23. A compound of claim 22 wherein $R_1$ is hydrogen or chlorine.

* * * * *